United States Patent
Takayama (10) Patent No.: US 11,254,232 B2
(45) Date of Patent: Feb. 22, 2022

(54) CONTROL APPARATUS OF VEHICLE, VEHICLE INCLUDING CONTROL APPARATUS, AND CONTROL METHOD OF VEHICLE

(71) Applicant: Toyota Jidosha Kabushiki Kaisha, Toyota (JP)

(72) Inventor: Daiki Takayama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 86 days.

(21) Appl. No.: 16/777,320

(22) Filed: Jan. 30, 2020

(65) Prior Publication Data

US 2020/0247262 A1 Aug. 6, 2020

(30) Foreign Application Priority Data

Feb. 5, 2019 (JP) .............................. JP2019-018612

(51) Int. Cl.
*H02J 7/00* (2006.01)
*B60L 53/66* (2019.01)
*H02J 7/02* (2016.01)
*B60L 53/14* (2019.01)
*B60L 53/16* (2019.01)
*B60K 6/28* (2007.10)

(52) U.S. Cl.
CPC .............. *B60L 53/66* (2019.02); *B60L 53/14* (2019.02); *B60L 53/16* (2019.02); *H02J 7/00034* (2020.01); *H02J 7/02* (2013.01); *B60K 6/28* (2013.01); *B60Y 2200/91* (2013.01); *B60Y 2200/92* (2013.01); *B60Y 2300/91* (2013.01); *Y02T 90/14* (2013.01)

(58) Field of Classification Search
CPC .......... B60L 53/66; B60L 53/16; B60L 53/14; H02J 7/00034; H02J 7/02; Y02T 90/14; B60Y 2300/91; B60Y 2200/91; B60Y 2200/92; B60K 6/28
USPC .................................. 320/109, 103; 701/22
See application file for complete search history.

(56) References Cited

U.S. PATENT DOCUMENTS

2009/0302801 A1* 12/2009 Katsunaga .............. B60L 53/14
                                                        320/109
2012/0221753 A1   8/2012 Hartwich

FOREIGN PATENT DOCUMENTS

JP         2013-504831 A      2/2013

OTHER PUBLICATIONS

U.S. Appl. No. 16/780,391, filed Feb. 3, 2020 Inventor: Daiki Takayama.

* cited by examiner

*Primary Examiner* — Zixuan Zhou
(74) *Attorney, Agent, or Firm* — Dinsmore & Shohl LLP (57) ABSTRACT

A control apparatus of a vehicle includes an input and output port configured to input and output signals transmitted and received between the vehicle and a charger and an electronic control unit configured to control the transmission and reception of the signals through the input and output port according to a communication sequence defined in order to charge an electric power storage device. The communication sequence defines that the vehicle proceeds with the communication sequence based on a content represented by the signal received by the vehicle from the charger. The electronic control unit is configured to proceed with the communication sequence regardless of the content represented by a predetermined specific signal when the signal received from the charger is the predetermined specific signal.

4 Claims, 9 Drawing Sheets

<CHARGING STOP MESSAGE CST>

| CST1<br>1byte | CST2<br>2byte | CST4<br>1byte |
|---|---|---|

| MESSAGE | PROCEED WITH SUBSEQUENT SEQUENCE WITHOUT REFERRING TO DATA FIELD | PROCEED WITH SUBSEQUENT SEQUENCE ACCORDING TO DATA FIELD | CORRESPONDING DRAWINGS |
|---|---|---|---|
| CHM | Y | | FIG. 7 |
| CRM | | Y | FIG. 9 |
| CML | | Y | FIG. 10 |
| CRO | | Y | FIG. 9 |
| CCS | Y | | FIG. 7 |
| CST | Y | | FIG. 7 |
| CSD | Y | | FIG. 7 |

FIG. 11

CONTROL APPARATUS OF VEHICLE, VEHICLE INCLUDING CONTROL APPARATUS, AND CONTROL METHOD OF VEHICLE

CROSS-REFERENCE TO RELATED APPLICATIONS

This application claims priority to Japanese Patent Application No. 2019-018612 filed on Feb. 5, 2019 incorporated herein by reference in its entirety.

BACKGROUND

1. Technical Field

The disclosure relates to a control apparatus of a vehicle, a vehicle including a control apparatus, and a control method of a vehicle, and more specifically, a technique of charging an in-vehicle electric power storage device with electric power supplied from a charger provided outside a vehicle.

2. Description of Related Art

In recent years, vehicles such as plug-in hybrid vehicles and electric vehicles are commercially available. The vehicles are configured to be capable of "external charging" in which an in-vehicle electric power storage device is charged with electric power supplied from a charger provided outside the vehicle.

In the future, the capacity of the in-vehicle electric power storage device is expected to increase. Accordingly, it is possible to extend an EV traveling distance of the vehicle (distance that the vehicle can travel with the electric power stored in the electric power storage device). On the other hand, when a charging time becomes excessively long with the increased capacity of the electric power storage device, the convenience for the user may be reduced. Therefore, in order to shorten the charging time, external charging with higher electric power (for example, several hundreds of kW) than charging electric power in the related art (for example, several tens of kW) is studied. Hereinafter, such charging is also referred to as "rapid charging".

SUMMARY

The rapid charging proceeds by the vehicle and the charger executing a series of processes defined in a charging standard in cooperation with each other. In the rapid charging, various signals are transmitted and received between the vehicle and the charger in accordance with a communication sequence defined in the charging standard. By executing the communication sequence, the vehicle and the charger can establish a communication link, decide a charging condition, or mutually confirm success or failure of charging preparation (details will be described below).

In the rapid charging, a charging standard different from the related art (hereinafter also referred to as "new standard") is employed. For example, there may be various chargers in the market in the early stage of the rapid charging, but not all the chargers are completely compliant (adapted) to the new standard. Some chargers may transmit a signal representing a content different from a content defined in the new standard (a signal representing a content not defined in the new standard). In this case, the communication sequence cannot proceed forward and thus it is impossible to appropriately charge the electric power storage device.

The disclosure provides a control apparatus of a vehicle, a vehicle including a control apparatus, and a control method of a vehicle that increase a possibility of charging an electric power storage device even when a charger does not comply with a communication sequence.

A first aspect of the disclosure relates to a control apparatus of a vehicle configured to be able to charge an in-vehicle electric power storage device with electric power supplied from a charger provided outside the vehicle. The control apparatus of the vehicle includes an input and output unit and an electronic control unit. The input and output unit is configured to input and output signals transmitted and received between the vehicle and the charger. The electronic control unit is configured to control transmission and reception of the signals through the input and output unit according to a communication sequence defined in order to charge the electric power storage device. The communication sequence defines that the vehicle proceeds with the communication sequence based on a content represented by the signal received by the vehicle from the charger. The electronic control unit is configured to proceed with the communication sequence regardless of the content represented by a predetermined specific signal when the signal received from the charger is the predetermined specific signal.

In the aspect, the predetermined specific signal may include at least one of a first signal, a second signal, a third signal, or a fourth signal. The first signal may be a signal for performing a handshake between the vehicle and the charger. The second signal may be a signal including information on a supply voltage and a supply current of the charger. The third signal may be a signal including information relating to a cause of stopping electric power supply by the charger. The fourth signal may be a signal including information relating to charging performance from the charger to the vehicle.

According to the first aspect and configuration described above, the electronic control unit proceeds forward with the communication sequence regardless of the content represented by the predetermined specific signal for the predetermined specific signals (first signal, second signal, third signal, and fourth signal) that do not represent the content required for electric power exchange between the vehicle and the charger. Accordingly, it is possible to prevent the communication sequence from being stopped due to an error in the content of the predetermined specific signal. As a result, it is possible to increase a possibility of charging the electric power storage device even when the charger side is not completely compliant with the communication sequence of a new standard.

In the above configuration, the electronic control unit may be configured to proceed with the communication sequence regardless of the content represented by the predetermined specific signal when the signal received from the charger is the predetermined specific signal. The electronic control unit may be configured to determine whether or not to proceed with the communication sequence according to contents represented by other signals other than the predetermined specific signal when the signal received from the charger is the other signals.

In the above configuration, the electronic control unit may determine whether or not a control by the charger reaches a predetermined timeout time when the other signals received from the charger do not represent contents defined in the communication sequence. The electronic control unit may end the control when a time from a start of the control by the charger reaches the predetermined timeout time.

In the above configuration, the other signals may include at least one of a fifth signal, a sixth signal, or a seventh signal. The fifth signal may be a signal representing whether or not the charger identifies the vehicle. The sixth signal may be a signal for calculating maximum electric power that is able to be supplied from the charger. The seventh signal may be a signal representing whether or not preparation for electric power supply of the charger is completed.

According to the above configuration, for other signals (the fifth signal, the sixth signal, and the seventh signal) representing the contents required for the electric power exchange between the vehicle and the charger, the electronic control unit refers to the contents of the signals and determines whether or not to proceed forward with the communication sequence according to the contents. Accordingly, it is possible to confirm establishment of a communication link (fifth signal) and to ensure the safety of the electric power exchange (fifth or sixth signal).

A second aspect of the disclosure relates to a vehicle. The vehicle includes the electric power storage device and the control apparatus according to the first aspect. According to the above aspect, it is possible to provide a vehicle capable of increasing a possibility of charging the electric power storage device even when the charger does not comply with the communication sequence.

A third aspect of the disclosure relates to a control method of a vehicle configured to be able to charge an in-vehicle electric power storage device with electric power supplied from a charger provided outside the vehicle. The vehicle is configured to transmit and receive signals to and from the charger according to a communication sequence defined in order to charge the electric power storage device. The communication sequence defines that the vehicle proceeds with the communication sequence based on a content represented by the signal received by the vehicle from the charger. The control method of the vehicle includes: (i) determining whether or not the signal received from the charger is a predetermined specific signal; and (ii) proceeding with the communication sequence regardless of the content represented by the predetermined specific signal when the signal received from the charger is the predetermined specific signal.

According to the method of the third aspect, similar to the first aspect, it is possible to increase a possibility of charging the electric power storage device even when the charger does not comply with the communication sequence.

According to the disclosure, it is possible to increase the possibility that external charging can be performed even when the charger does not comply with the communication sequence defined in a charging standard.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment will be described in detail with reference to drawings. The same reference numerals are assigned to the same or corresponding portions of the drawings and description thereof will not be repeated.

Figure 1:
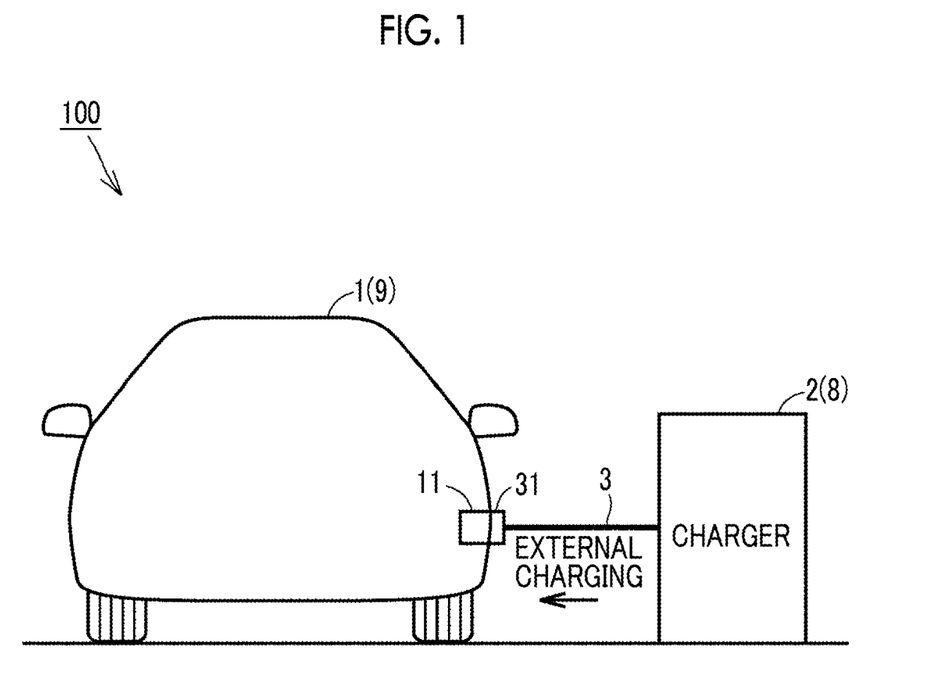
FIG. 1 is a diagram schematically showing an overall configuration of a charging system according to an embodiment of the disclosure.

An overall configuration of a charging system of the embodiment will be described. FIG. 1 is a diagram schematically showing the overall configuration of the charging system according to the embodiment of the disclosure. Referring to FIG. 1, a charging system 100 includes a vehicle 1, a charger 2, and a charging cable 3. FIG. 1 shows a situation when the vehicle 1 and the charger 2 are electrically connected by the charging cable 3 and external charging is performed from the charger 2 to the vehicle 1.

The vehicle 1 is, for example, an electric vehicle. However, the vehicle 1 may be any vehicle configured to be externally chargeable, for example, a plug-in hybrid vehicle. The charger 2 is, for example, a rapid charger provided in a public charging stand (also referred to as a charging station).

Figure 2:
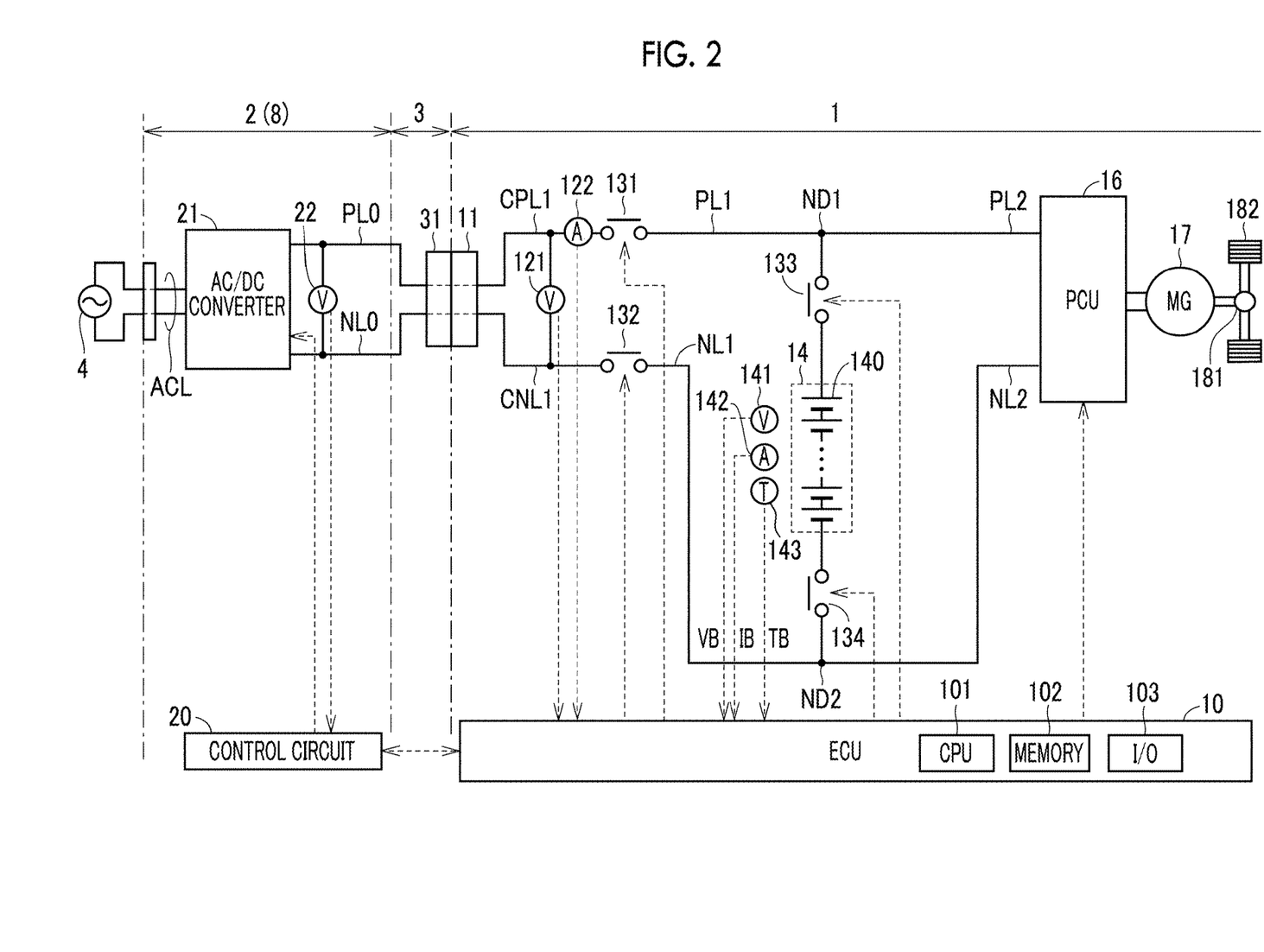
FIG. 2 is a block diagram schematically showing a configuration of a vehicle and a charger.

FIG. 2 is a block diagram schematically showing a configuration of the vehicle 1 and the charger 2. Referring to FIG. 2, the charger 2 is a direct current (DC) charger and converts electric power supplied from a system power supply 4 (alternating current (AC) power) into charging electric power (DC power) of a battery 14 mounted on vehicle 1. The charger 2 includes a first electric power line ACL, an AC-DC converter 21, a voltage sensor 22, electric power supply lines PL0 and NL0, and a control circuit 20.

The first electric power line ACL is electrically connected to the system power supply 4. The first electric power line ACL transmits the AC power from the system power supply 4 to the AC-DC converter 21.

The AC-DC converter 21 converts the AC power on the first electric power line ACL into the DC power for charging the battery 14 mounted on the vehicle 1. The electric power conversion by the AC-DC converter 21 may be executed by a combination of AC-DC conversion for power factor improvement and DC-DC conversion for voltage level adjustment. The DC power output from the AC-DC converter 21 is supplied by the electric power supply line PL0 on a positive electrode side and the electric power supply line NL0 on a negative electrode side.

Voltage sensor 22 is electrically connected between the electric power supply line PL0 and the electric power supply line NL0. The voltage sensor 22 detects a voltage between the electric power supply line PL0 and the electric power supply line NL0 and outputs the detection result to the control circuit 20.

The control circuit 20 includes a CPU, a memory, and an input and output port (all not shown). The control circuit 20 controls an electric power conversion operation by the AC-DC converter 21 based on the voltage detected by the voltage sensor 22, a signal from the vehicle 1, and a map and a program stored in the memory.

The vehicle 1 includes an inlet 11, a first charging line CPL1, a second charging line CNL1, a voltage sensor 121, a current sensor 122, a first electric power line PL1, a second electric power line NL1, charging relays 131 and 132, a first system main relay (SMR) 133 and a second SMR 134 of a SMR, the battery 14, a third electric power line PL2, a fourth electric power line NL2, a power control unit (PCU) 16, a motor generator 17, a power transmission gear 181, drive wheels 182, and an electronic control unit (ECU) 10 (hereinafter referred to as ECU 10).

The inlet (charging port) 11 is configured such that a connector 31 of the charging cable 3 can be inserted with mechanical connection such as fitting. With the insertion of the connector 31 is inserted, an electrical connection between the electric power supply line PL0 and a contact point on a positive electrode side of the inlet 11 is ensured, and an electrical connection between the electric power supply line NL0 and a contact point on a negative electrode side of the inlet 11 is ensured. Further, with the connection of the inlet 11 and the connector 31 by the charging cable 3, the ECU 10 of the vehicle 1 and the control circuit 20 of the charger 2 communicate with each other according to a communication standard such as a controller area network (CAN) and thus various pieces of information such as a signal, a command, and a message or data can be transmitted and received to and from each other.

The voltage sensor 121 is electrically connected between the first charging line CPL1 and the second charging line CNL1 on the inlet 11 side rather than the charging relays 131 and 132. The voltage sensor 121 detects a DC voltage between the first charging line CPL1 and the second charging line CNL1 and outputs the detection result to ECU 10. The current sensor 122 is provided on the first charging line CPL1. The current sensor 122 detects a current flowing through the first charging line CPL1 and outputs the detection result to ECU 10. The ECU 10 can also calculate the electric power supplied from the charger 2 (charging amount of the battery 14) based on the detection results of the voltage sensor 121 and the current sensor 122.

The charging relay 131 is connected to the first charging line CPL1, and the charging relay 132 is connected to the second charging line CNL1. The closing and opening of the charging relays 131 and 132 are controlled in response to a command from the ECU 10. When the charging relays 131 and 132 are closed and the first SMR 133 and the second SMR 134 are closed, the electric power can be transmitted between the inlet 11 and the battery 14.

The battery 14 supplies electric power for generating the driving force of the vehicle 1. Further, the battery 14 stores electric power generated by the motor generator 17. The battery 14 is an assembled battery including a plurality of cells 140. Each cell 140 is a secondary battery such as a lithium ion secondary battery or a nickel-metal hydride battery. The battery 14 is an example of an "electric power storage device" according to the disclosure. Instead of the battery 14, a capacitor such as an electric double-layer capacitor may be used.

The positive electrode of the battery 14 is electrically connected to a node ND1 through the first SMR 133. The node ND1 is electrically connected to the first electric power line PL1 and the third electric power line PL2. Similarly, the negative electrode of the battery 14 is electrically connected to the node ND2 through the second SMR 134. The node ND2 is electrically connected to the second electric power line NL1 and the fourth electric power line NL2. The closing and opening of the first SMR 133 and the second SMR 134 are controlled in response to a command from the ECU 10.

The battery 14 is provided with a voltage sensor 141, a current sensor 142, and a battery temperature sensor 143. The voltage sensor 141 detects a voltage VB of the battery 14. The current sensor 142 detects a current IB to be input and output to and from the battery 14. The battery temperature sensor 143 detects a temperature TB of the battery 14. Each sensor outputs the detection result to ECU 10. The ECU 10 can calculate a state of charge (SOC) of the battery 14 based on the detection result by the voltage sensor 141 and/or the current sensor 142.

The PCU 16 is electrically connected between the third electric power line PL2, fourth electric power line NL2, and motor generator 17. The PCU 16 includes a converter and an inverter (both not shown) and drives the motor generator 17 in response to a command from ECU 10.

The motor generator 17 is an AC rotating electric machine, for example, a permanent magnet type synchronous motor including a rotor in which a permanent magnet is embedded. Output torque of the motor generator 17 is transmitted to the drive wheels 182 through the power transmission gear 181 and causes the vehicle 1 to travel. Further, the motor generator 17 can generate electric power by rotational force of the drive wheels 182 during a braking operation of the vehicle 1. The electric power generated by the motor generator 17 is converted by the PCU 16 into charging electric power for the battery 14.

Similar to the control circuit 20, the ECU 10 includes a CPU 101, a memory 102 such as a read only memory (ROM) and a random-access memory (RAM), and an input and output port 103. The ECU 10 controls apparatuses such that vehicle 1 is in a desired state in response to a signal from each sensor or the like. The ECU 10 may be divided into a plurality of ECUs for each function. The input and output port 103 is an example of an "input and output unit" according to the disclosure.

An example of a main control executed by the ECU 10 is an external charging control that charges the in-vehicle battery 14 with the electric power supplied from the charger 2. The external charging control proceeds by mutually transmitting and receiving various messages between the ECU 10 of the vehicle 1 and the control circuit 20 of the charger 2 through the charging cable 3. Hereinafter, the transmission and reception of the messages will be described in detail.

Next, a standard communication sequence will be described. In the external charging control, a communication sequence relating to a message exchange between the vehicle 1 and the charger 2 proceeds, and a charging sequence relating to an electric power exchange between the vehicle 1 and the charger 2 proceeds. Both the communication sequence and the charging sequence are defined in a charging standard (new standard) of rapid charging. In the following, an example of the communication sequence will be schematically described.

Figure 3:
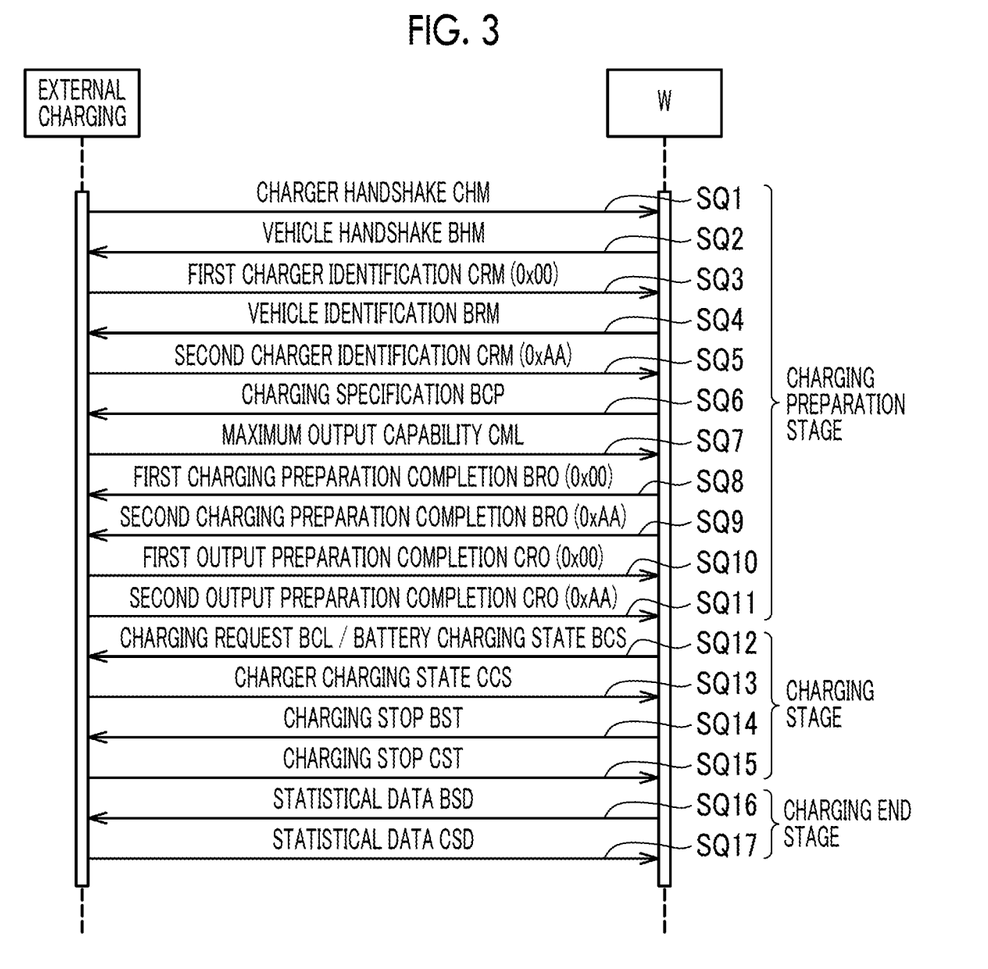
FIG. 3 is a communication sequence diagram of an external charging control defined in a charging standard shown in FIG. 2.

FIG. 3 is a sequence diagram showing an example of the communication sequence of the external charging control. In FIG. 3 and FIGS. 4 to 11 to be described below, a sequence process executed by the control circuit 20 of the charger 2 is shown on the left side in the diagram, and a sequence process executed by the ECU 10 of the vehicle 1 is shown on the right side in the diagram. In the following, for the sake of simplicity, an execution subject of the process executed by the ECU 10 may be described as the vehicle 1, and an execution subject of the process executed by the control circuit 20 may be described as the charger 2.

Referring to FIG. 3, this communication sequence is started when the vehicle 1 and the charger 2 are physically connected by the charging cable 3 and further low-voltage power supply for realizing the communication such as the CAN between the vehicle 1 and the charger 2 is supplied. The communication sequence shown in FIG. 3 may be referred to as a "standard communication sequence".

Processes included in the standard communication sequence are classified into a charging preparation stage (a charging handshake stage and a charging parameter disposition stage), a charging stage, and a charging end stage. In the charging preparation stage, establishment of a communication link between the vehicle 1 and the charger 2, deciding of a charging condition, confirmation of success or failure of charging preparation, and the like are performed. In the charging stage, actual electric power is supplied from the charger 2 to the vehicle 1 according to the charging sequence (not shown). At the charging end stage, statistical data relating to the current charging is exchanged between the vehicle 1 and the charger 2 after the electric power supply.

First, a handshake between the vehicle 1 and the charger 2 is performed in the charging preparation stage. Specifically, the charger 2 transmits a charger handshake message CHM to the vehicle 1 (SQ1). The charger handshake message CHM may include information relating to a version number of the communication sequence (communication protocol) with which the charger 2 complies. The vehicle 1 transmits a vehicle handshake message BHM to the charger 2 in response to the charger handshake message CHM (SQ2). The vehicle handshake message BHM may include information relating to a maximum allowable voltage of the vehicle 1.

Further, the process for establishing the communication link between the vehicle 1 and the charger 2 is executed. Specifically, the charger 2 transmits a first charger identification message CRM (0x00) indicating that the charger 2 does not yet identify the vehicle 1 to the vehicle 1 (SQ3). The vehicle 1 transmits a vehicle identification message BRM for the charger 2 to identify the vehicle 1 to the charger 2 in response to the first charger identification message CRM (0x00) (SQ4). The vehicle identification message BRM may include information relating to the version number of the communication sequence with which the vehicle 1 complies, the type of the battery 14 (such as lithium ion secondary battery or nickel-metal hydride battery), and a rating capacity and a rating voltage of the vehicle 1. The charger 2 transmits a second charger identification message CRM (0xAA) indicating that the charger 2 identifies the vehicle 1 to the vehicle 1 in response to the vehicle identification message BRM (SQ5).

Next, the vehicle 1 transmits a charging specification message BCP relating to specifications of the battery 14 mounted on the vehicle 1 to the charger 2 (SQ6). The charging specification message BCP may include information relating to maximum allowable voltages of the battery 14 and the cell 140, a maximum allowable current of the battery 14, a maximum allowable temperature, the SOC and the voltage VB, and the like. The charger 2 transmits a maximum output capability message CML for calculating maximum electric power that can be output to the vehicle 1 in response to the charging specification message BCP (SQ7). The maximum output capability message CML may include information relating to a minimum output voltage and a minimum output current in addition to a maximum output voltage and a maximum output current.

Subsequently, the vehicle 1 transmits a first charging preparation completion message BRO (0x00) indicating that the charging preparation for the vehicle 1 is not yet completed to the charger 2 (SQ8). Further, the vehicle 1 transmits a second charging preparation completion message BRO (0xAA) indicating that the charging preparation for the vehicle 1 is completed to the charger 2 (SQ9). The charger 2 transmits a first output preparation completion message CRO (0x00) indicating that the output (electric power supply) preparation from the charger 2 is not yet been completed to the vehicle 1 in response to the second charging preparation completion message BRO (0xAA) (SQ10). Further, the charger 2 transmits a second output preparation completion message CRO (0xAA) indicating that the output preparation from the charger 2 is completed to the vehicle 1 (SQ11). Accordingly, the charging preparation stage ends, and the process proceeds to the charging stage.

In the charging stage, the vehicle 1 transmits a charging request message BCL to the charger 2 and transmits a battery charging state message BCS to the charger 2 (SQ12). The charging request message BCL may include information relating to a request voltage and a request current from the vehicle 1 to the charger 2 and a charging mode (a constant voltage charging mode or a constant current charging mode). The battery charging state message BCS may include information relating to the charging voltage VB, the charging current IB, and SOC of the battery 14, an estimated value of a remaining charging time, and the like. On the other hand, the charger 2 transmits a charger charging state message CCS for performing a notification of a charging start (continuation) to the vehicle 1 (SQ13). The charger charging state message CCS may include information relating to an output voltage (supply voltage) and an output current (supply current) of the charger 2.

Thereafter, the vehicle 1 transmits a charging stop message BST indicating that the vehicle 1 stops the charging to the charger 2 (SQ14). The charging stop message BST may include information relating to a cause of the charging stop by the vehicle 1 or the like. The charger 2 transmits a charging stop message CST indicating that the charger 2 stops the charging to the vehicle 1 (SQ15). Information relating to a cause of the charging stop by the charger 2 or the like may be included. Accordingly, the charging stage ends, and the process proceeds to the charging end stage.

In the charging end stage, the vehicle 1 transmits a statistical data message BSD indicating statistical data of the vehicle 1 in the current charging process to the charger 2 (SQ16). The statistical data message BSD may include information relating to the SOC of the battery 14 at the time of the charging stop, and a minimum voltage, maximum voltage, minimum temperature, and maximum temperature of the battery 14. On the other hand, the charger 2 transmits a statistical data message CSD indicating statistical data of the charger 2 in the current charging process to the vehicle 1 (SQ17). The statistical data message CSD may include information relating to the current charging performance (for example, charging time and amount of output electric power from the charger 2 in the current charging). Accordingly, a series of communication sequences between the vehicle 1 and the charger 2 ends.

As described above, the standard communication sequence defined in the charging standard (new standard) of the rapid charging proceeds in order of the charging preparation stage, the charging stage, and the charging end stage while basically the messages (signals) are exchanged alternately between the vehicle 1 and the charger 2. In the following, the process on the vehicle 1 side at the time of the message reception in these stages will be described with the case of receiving the charging stop message CST as an example.

Figure 4:
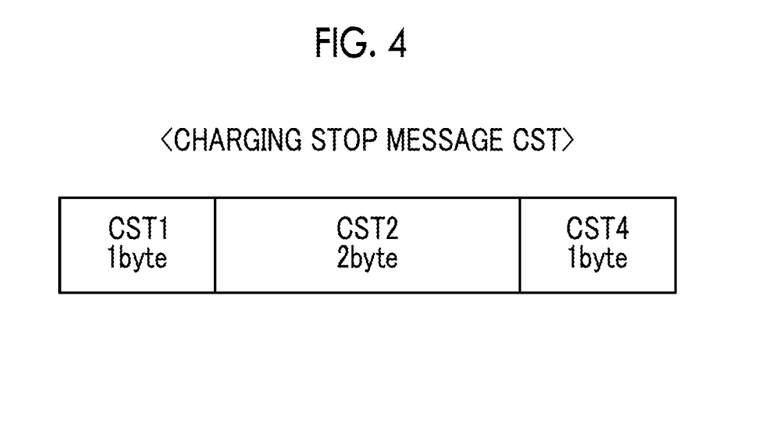
FIG. 4 is a diagram showing an example of a structure of a data field of a charging stop message of the charger.

Next, normal reception of the charging stop message CST will be described. FIG. 4 is a diagram showing an example of a structure (format) of a data field of the charging stop message CST. Referring to FIG. 4, the data field of the charging stop message CST (the content of the message) has, for example, a byte length of 4 bytes and represents the following contents.

The field of a first byte (indicated by CST1) of the charging stop message CST has a byte length of 1 byte and represents a cause of the charging stop by the charger (stop due to satisfaction of an end condition set in advance, stop by a user operation, stop due to charger failure, or the like). The field of a second byte (indicated by CST2) of the charging stop message CST has a byte length of 2 bytes and represents a failure cause of the charging stop by the charger (overheat failure of the charger, connector failure of the charger, or the like). The field of a fourth byte (indicated by CST4) of the charging stop message CST has a byte length of 1 byte and represents an error cause of the charging stop by the charger (current abnormality, voltage abnormality, or the like).

The content represented by each bit included in the field CST1 is defined in the communication sequence of the new standard. For example, the <00> that both a first bit and a second bit are 0 represents a normal charging stop. The <01> that the first bit is 0 and the second bit is 1 represents a stop due to reaching of the charger side to a set condition. The <10> that the first bit is 1 and the second bit is 0 represents that the vehicle 1 or the charger 2 is in an unreliable state. On the other hand, the <11> that both the first bit and the second bit are 1 is not defined in the communication sequence. Similar definitions are made for other fields CST2 and CST4.

Figure 5:
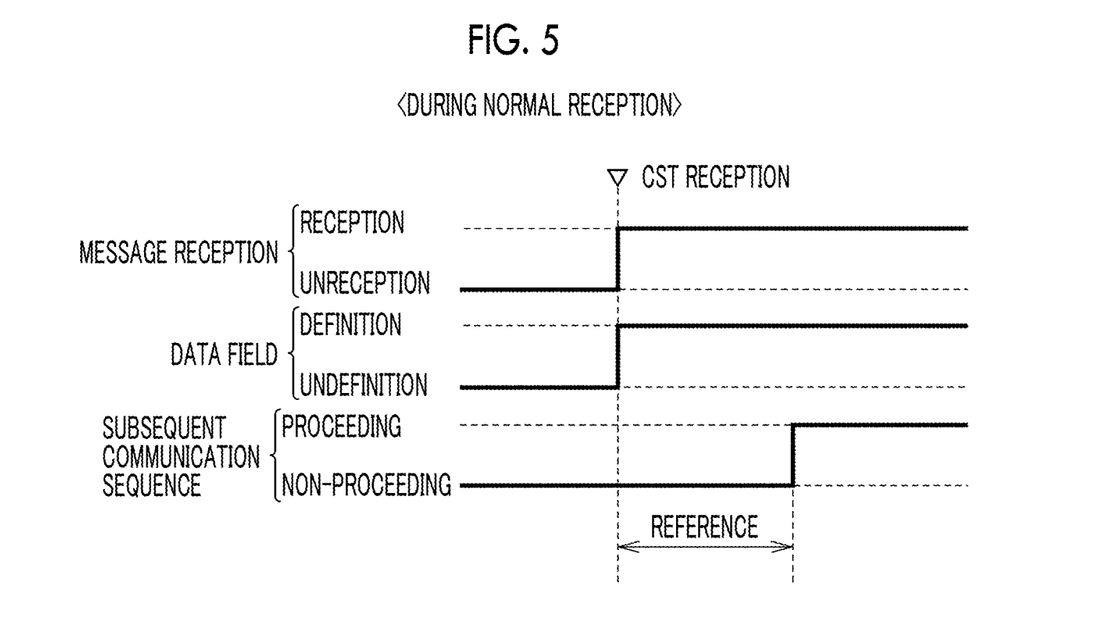
FIG. 5 is a conceptual diagram for describing a process when the charger receives the charging stop message as defined in the communication sequence of the charging standard of rapid charging (during normal reception)

FIG. 5 is a conceptual diagram for describing a process when the charging stop message CST is received as defined in the communication sequence of the charging standard (new standard) of the rapid charging (during normal reception). Referring to FIG. 5, when the charging stop message CST is received, the vehicle 1 refers to the data field included in charging stop message CST. More specifically, the vehicle 1 analyzes whether or not the data field included in the charging stop message CST represents the content described in FIG. 4 (content defined in the communication sequence). The vehicle 1 determines whether or not to receive the charging stop message CST according to the analysis result. When the vehicle 1 determines to receive the charging stop message CST, the vehicle 1 returns an acknowledgement to the charger 2 and proceeds forward with the communication sequence to transmit a next message to the charger 2. However, the reply of the acknowledgment is not necessarily required in the disclosure.

Since the charging stop message CST transmitted from the normal charger 2 includes the data field representing the content as defined in the communication sequence, it is possible for the vehicle 1 to proceed with the communication sequence. However, some chargers that are not completely compliant (adapted) to the new standard may transmit a data field representing a content different from the content as defined in the communication sequence (in other words, data field representing an undefined content or not representing the defined content) to the vehicle 1 as shown in the following comparative example.

In the following, a charger that is not completely compliant with the new standard is referred to as "charger 8" with respect to the charger 2 compliant with the new standard, and a vehicle in the comparative example is referred to as "vehicle 9". Basic configurations of the charger 8 and the vehicle 9 are the same as the configurations shown in FIGS. 1 and 2.

Figure 6:
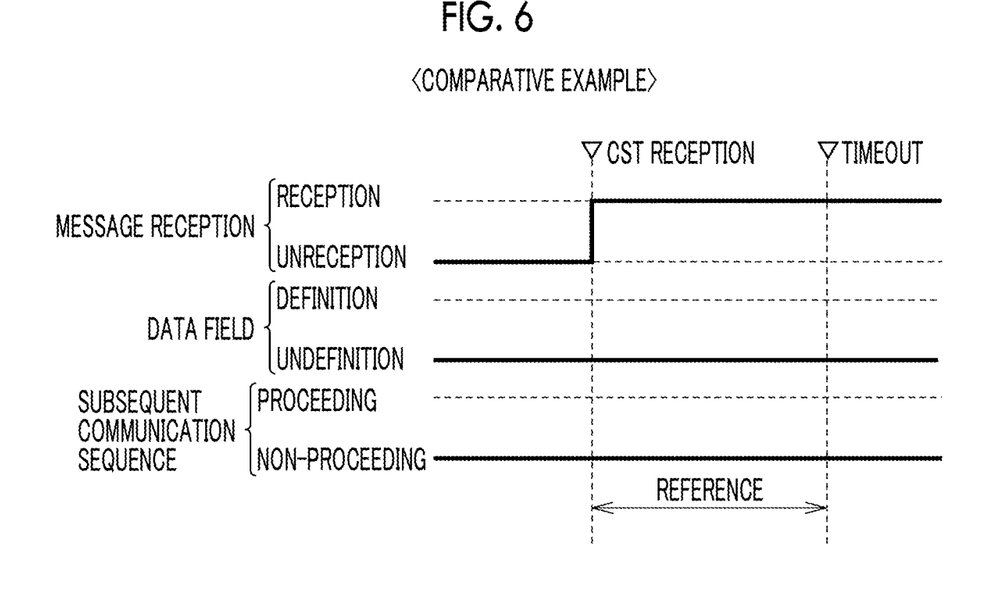
FIG. 6 is a conceptual diagram for describing a process of a comparative example with respect to a process at the time of receiving the charging stop message in the embodiment.

Next, the reception of the charging stop message in the comparative example will be described with respect to the process at the time of receiving the charging stop message in the embodiment. FIG. 6 is a conceptual diagram for describing a process at the time of receiving the charging stop message CST in the comparative example. Referring to FIG. 6, the charger 8 in the comparative example transmits a charging stop message CST including a data field representing a content different from the content defined in the communication sequence to the vehicle 9. For example, in the example shown in FIG. 4, the charging stop message CST with both the first bit and the second bit set to 1 and including an undefined field CST1 is transmitted.

The vehicle 9 does not receive the charging stop message CST when the fact that the data field included in the charging stop message CST does not represent the content defined in the communication sequence becomes clear by referring to the content of the received charging stop message CST. In this case, unless another charging stop message CST as defined in the communication sequence is transmitted from the charger 8, the communication sequence cannot proceed forward by the vehicle 1. As a result, a timeout process (described below) is reached, and the external charging control ends.

Figure 7:
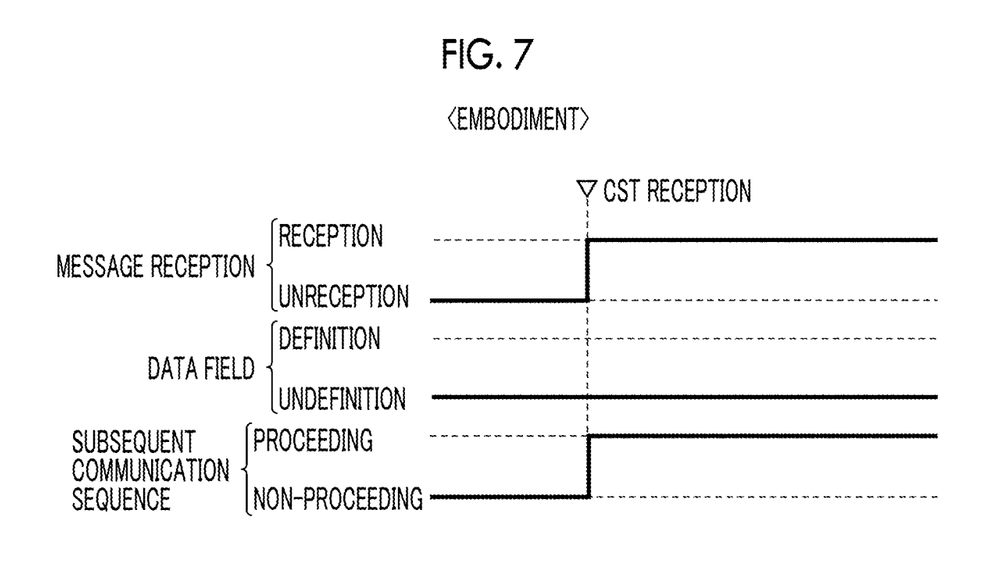
FIG. 7 is a conceptual diagram for describing the process at the time of receiving the charging stop message in the embodiment.

Next, a process at the time of the reception in the embodiment will be described. FIG. 7 is a conceptual diagram for describing the process at the time of receiving the charging stop message CST in the embodiment. Referring to FIG. 7, the charger 8 transmits a data field representing a content different from the content defined in the communication sequence to vehicle 1 also in the embodiment similar to the comparative example.

In the embodiment, the vehicle 1 does not refer to the content of the received charging stop message CST. That is, when the vehicle 1 knows that the received message is the charging stop message CST, the vehicle 1 receives the charging stop message CST without analyzing whether or not the data field included in the charging stop message CST represents the content defined in the communication sequence and proceed forward with the communication sequence. Accordingly, when the charger 8 which is a transmission source of the charging stop message CST does not comply with the communication sequence, it is possible to prevent the communication sequence from being stopped due to the data field of the charging stop message CST.

Although the charging stop message CST is described as an example in FIG. 4 to FIG. 7, the same process can be performed for other messages. On the other hand, the same process is not desirable to be performed for all the messages.

Figure 8:
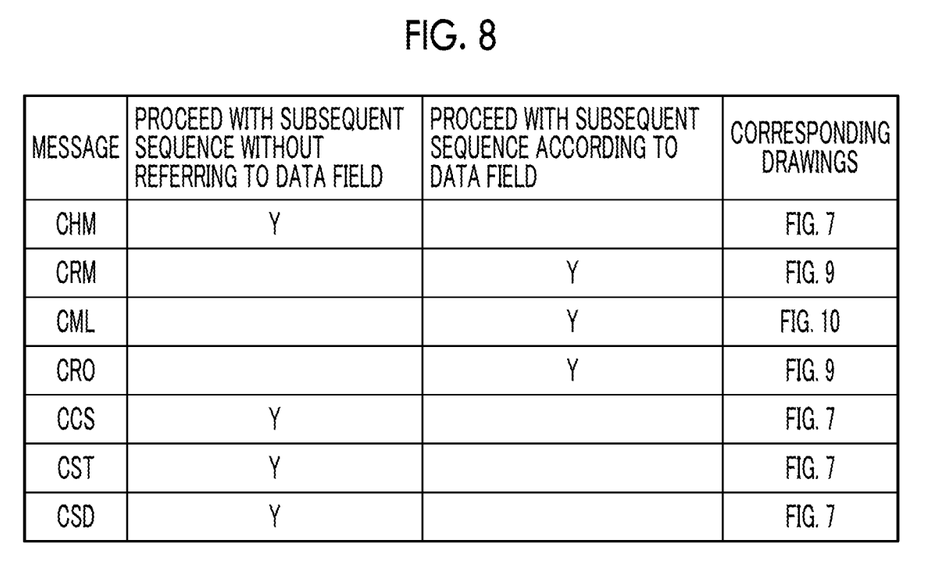
FIG. 8 is a diagram that summarizes an outline of process contents for each message transmitted and received between the vehicle and the charger.

FIG. 8 is a diagram that summarizes an outline of the process contents for each message. Referring to FIG. 8, the information such as the version number of the communication sequence included in the data field of the charger handshake message CHM is not necessarily required for the electric power supply. Further, the information relating to the output voltage and output current of the charger 2 included in the charger charging state message CCS is not necessarily required. Furthermore, the information included in the data field of the statistical data message CSD is for transmitting the information relating to the charging performance (the charging time and the amount of output electric power from the charger 2) at the charging end stage and is not necessarily required for the electric power supply. Therefore, when the vehicle 1 receives the message from the charger 8, the vehicle 1 can proceed with the subsequent processes of the communication sequence without referring to the data field (contents or content) of the message also for the charger handshake message CHM, the charger charging state message CCS, and the charger statistical data message CSD.

On the contrary, the vehicle 1 refers to the data field of the message and determines whether or not to proceed forward with the process of the communication sequence for the charger identification message CRM (the first charger identification message CRM (0x00) and the second charger identification message CRM (0xAA)), the maximum output capability message CML, and the output preparation completion message CRO (the first output preparation completion message CRO (0x00) and the second output preparation completion message CRO (0xAA)).

Figure 9:
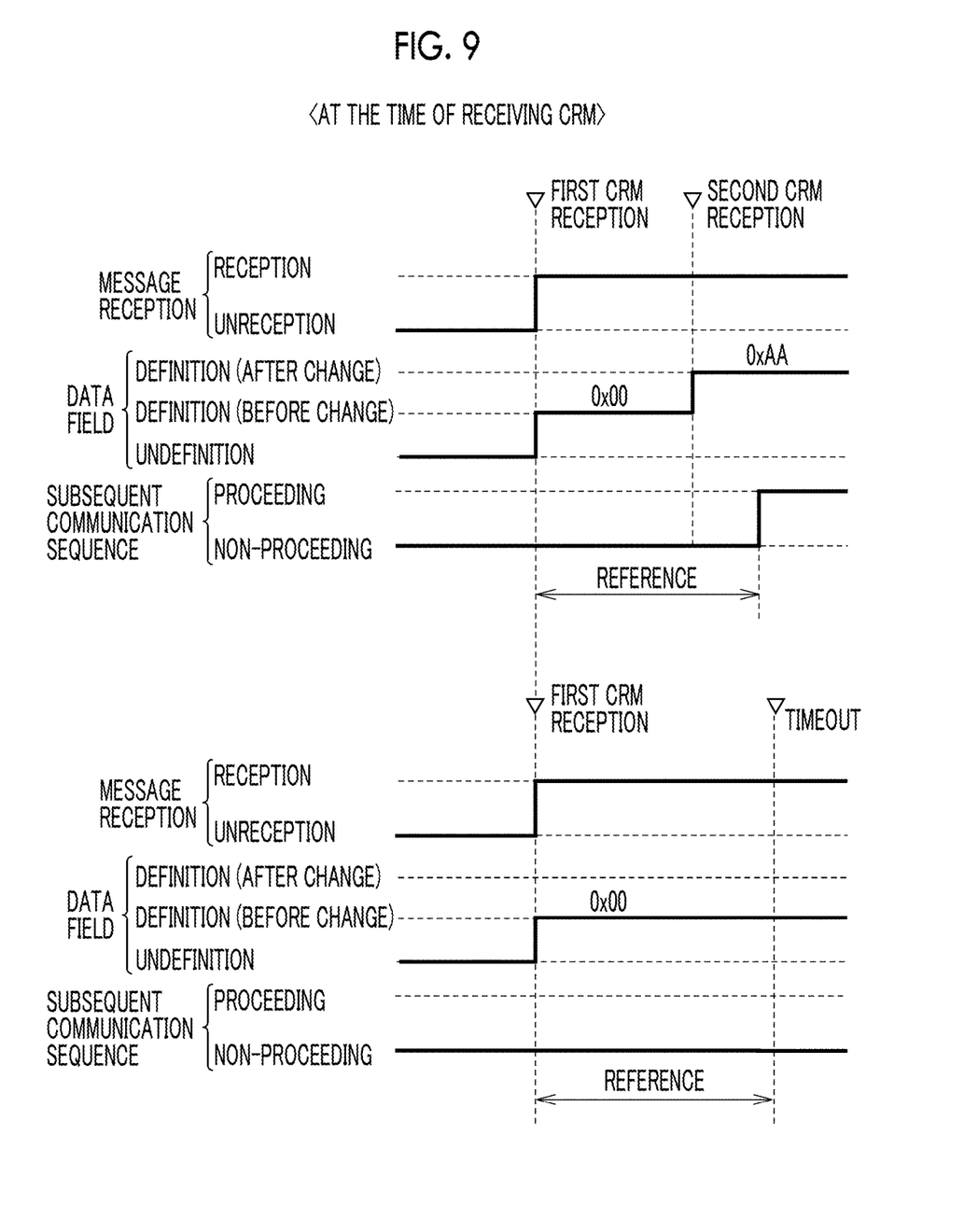
FIG. 9 is a conceptual diagram for describing a process at the time of receiving a charger identification message in the embodiment.

FIG. 9 is a conceptual diagram for describing the process at the time of receiving the charger identification message CRM in the embodiment. Referring to FIG. 9, when the vehicle 1 knows that the received message is the charger identification message CRM, the vehicle 1 also refers to the data field of charger identification message CRM in the embodiment. Specifically, the vehicle 1 first receives the first charger identification message CRM (0x00) indicating that the charger 8 does not yet identify the vehicle 1 from the charger 8. Thereafter, the data field of the message is changed by the charger 8, and the vehicle 1 receives the second charger identification message CRM (0xAA) indicating that the charger 8 already identifies the vehicle 1 from the charger 8. In this case, the vehicle 1 proceeds forward with the communication sequence assuming that charger identification message CRM is received.

With the communication sequence described in FIG. 3, the vehicle 1 transmits the vehicle identification message BRM to the charger 8 in response to the first charger identification message CRM (0x00) (SQ4). However, in the embodiment, even when the vehicle 1 receives the second charger identification message CRM (0xAA) from the charger 8 without transmitting the vehicle identification message BRM to the charger 8, the communication sequence proceeds forward.

On the other hand, it is not desirable to proceed with the communication sequence while the fact that the charger 8 already identifies the vehicle 1 is confirmed by receiving the second charger identification message CRM (0xAA). Therefore, the vehicle 1 does not proceed forward with the communication sequence when the charger identification message CRM is not switched from the first charger identification message CRM (0x00) to the second charger identification message CRM (0xAA) and allows the timeout process to occur.

Although the charger identification message CRM is described as an example in FIG. 9, the same process is executed for the output preparation completion message CRO.

Figure 10:
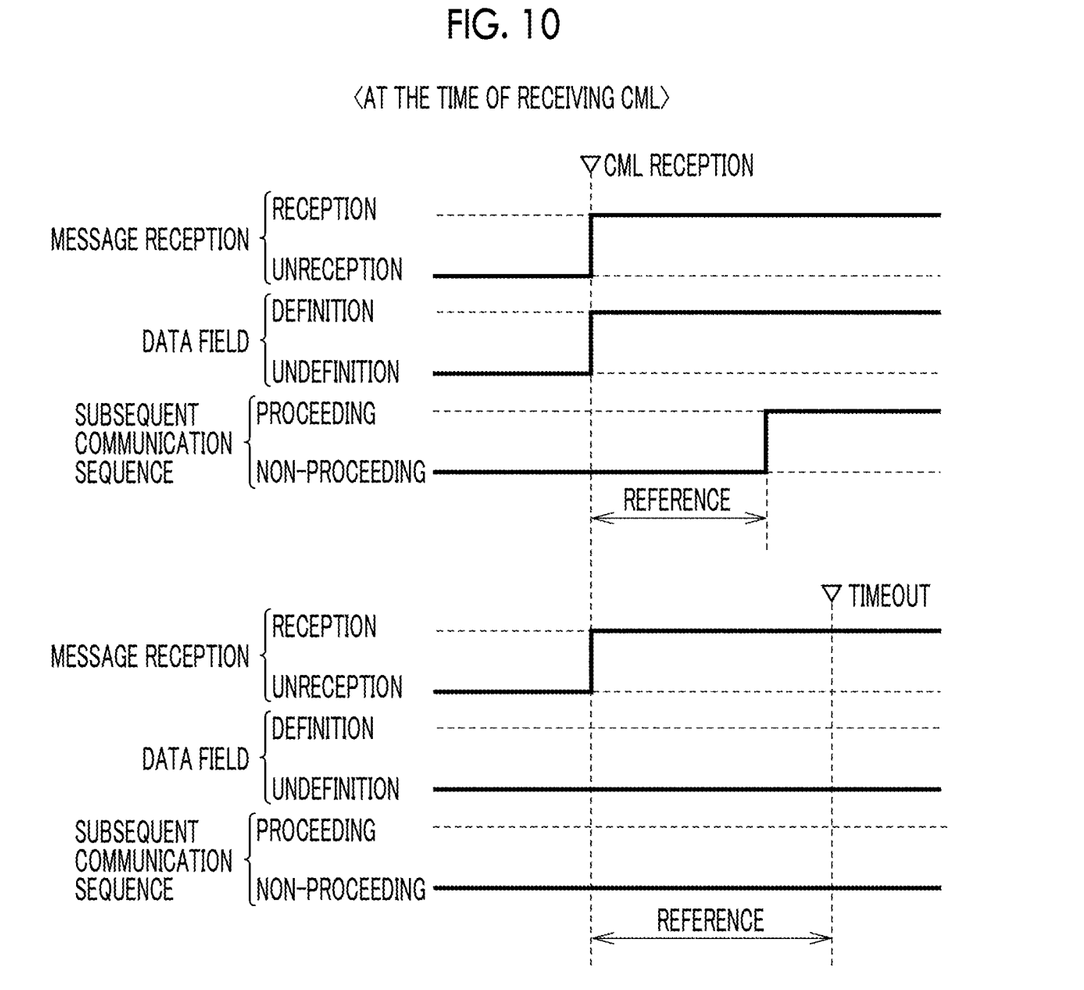
FIG. 10 is a conceptual diagram for describing a process at the time of receiving a maximum output capability message in the embodiment.

FIG. 10 is a conceptual diagram for describing the process at the time of receiving the maximum output capability message CML according to the embodiment. Referring to FIG. 10, when the vehicle 1 knows that the received message is the maximum output capability message CML, the vehicle 1 refers to the data field of the maximum output capability message CML. Specifically, the vehicle 1 analyzes whether or not the information for calculating the maximum electric power that can be output from the charger 8 included in the data field of the maximum output capability message CML is defined in the communication sequence.

The information included in the maximum output capability message CML is specifically the maximum output voltage and maximum output current and the minimum output voltage and minimum output current of the charger 8 and is indispensable to decide the charging condition for a safe electric power exchange between the vehicle 1 and the charger 8. Therefore, while the vehicle 1 proceeds forward with the communication sequence when the information included in the data field of the maximum output capability message CML received from the charger 8 is defined in the communication sequence, the vehicle 1 does not proceed forward with the communication sequence when the information is not defined in the communication sequence.

The charger handshake message CHM is an example of a "first signal" according to the disclosure. The charger charging state message CCS is an example of a "second signal" according to the disclosure. The charging stop message CST is an example of a "third signal" according to the disclosure. The output preparation completion message CRO is an example of a "fourth signal" according to the disclosure. In the embodiment, the communication sequence proceeds without referring to the contents of all the four signals. However, the process may be performed only on any one to three of the four signals. That is, the process may be performed on at least one of the four signals.

The charger identification message CRM is an example of a "fifth signal" according to the disclosure. The maximum output capability message CML is an example of a "sixth signal" according to the disclosure. The output preparation completion message CRO is an example of a "seventh signal" according to the disclosure.

Figure 11:
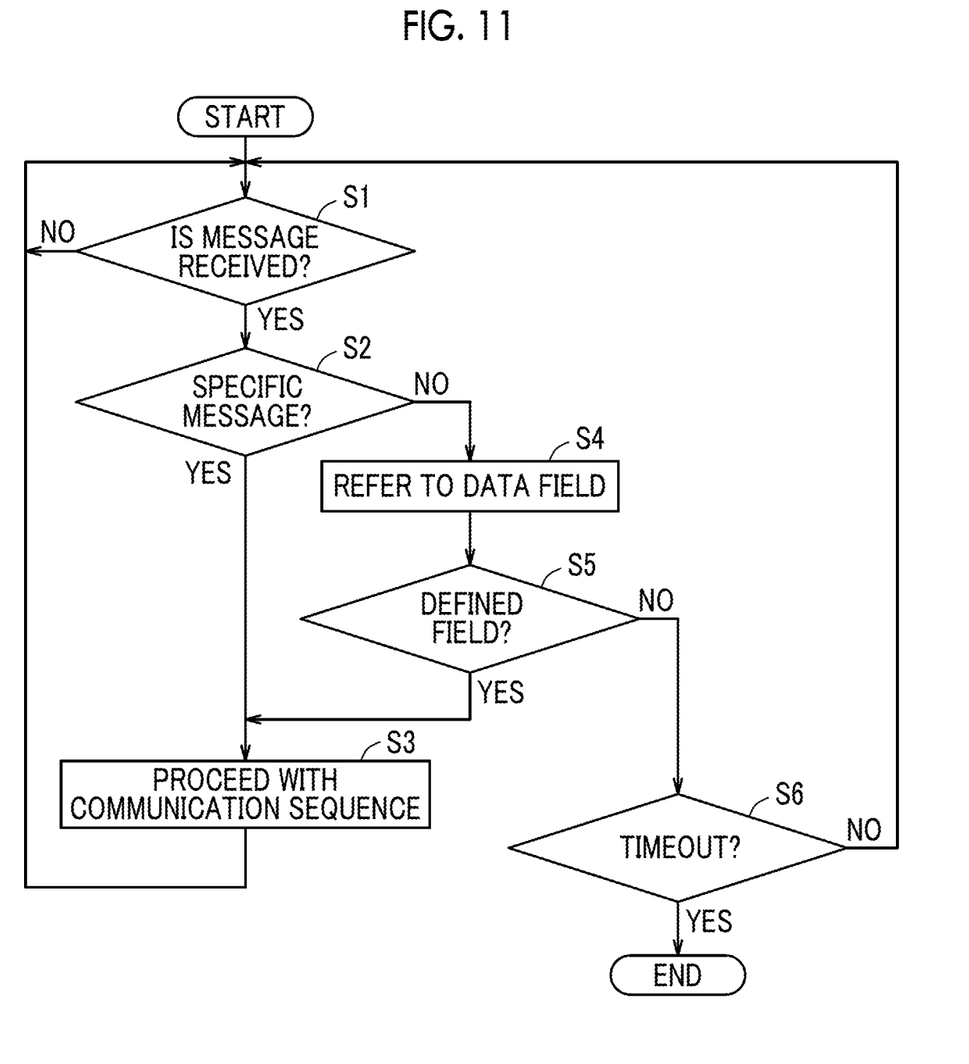
FIG. 11 is a flowchart showing the communication sequence of the external charging control in the embodiment.

Next, a flow of the external charging control will be described. FIG. 11 is a flowchart showing the communication sequence of the external charging control in the embodiment. Referring to FIG. 11, this flowchart is executed when low voltage power supply is supplied in a state where the vehicle 1 and the charger 8 (which may be the charger 2) are connected by the charging cable 3 and the CAN communication or the like becomes possible between the vehicle 1 and the charger 8. Each step (hereinafter step is abbreviated as S) is realized by a software process by the ECU 10, but may be realized by hardware (electric circuit) manufactured in the ECU 10.

Referring to FIG. 11, the ECU 10 determines whether or not a message is received from charger 8 in S1. When the message is received (YES in S1), the ECU 10 determines whether or not the message is a specific message in S2.

When the received message is the specific message, that is, any one of the charging stop message CST, the charger handshake message CHM, the charger charging state message CCS, and the charger statistical data message CSD (YES in S2), the ECU 10 proceeds with the communication sequence without referring to the data field assuming that the information included in the data field of the message is not necessarily required in S3. Thereafter, the process returns to S1.

On the contrary, when the received message is another message other than the specific message, that is, any one of the charger identification message CRM, the maximum output capability message CML, and the output preparation completion message CRO (NO in S2), the ECU 10 refers to the data field for acquiring the information included in the data field of the message in step S4. In S5, the ECU 10 analyzes whether or not the data field represents the content defined in the communication sequence. Whether or not the content of the data field is the defined content is described in detail with reference to FIG. 9 or FIG. 10, and thus detailed description will not be repeated.

When the data field of the received message represents the content defined in the communication sequence (YES in S5), the ECU 10 proceeds with the process to S3 and executes the subsequent communication sequence. On the contrary, when the data field of the received message does not represent the content defined in the communication sequence (NO in S5), the ECU 10 determines whether or not the external charging control reaches a timeout in S6.

When an elapsed time from the start of the flow of the external charging control shown in FIG. 11 reaches a predetermined timeout time (for example, several tens of seconds) (YES in S6), the ECU 10 ends the process assuming that the external charging control cannot be executed normally. When the external charging control does not reach the timeout (NO in S6), the process returns to S1.

As described above, according to the embodiment, the vehicle 1 proceeds forward with the communication sequence regardless of the data field (message content or contents) of the message for the specific messages (CHM, CCS, CST, and CSD) in which the data field does not represent the contents required for the electric power exchange. Accordingly, it is possible to prevent the communication sequence from being stopped due to an error in the data field even when the charger 8 side is not completely compliant with the communication sequence of the new standard. On the other hand, the vehicle 1 refers to the data field of the message and determines whether or not to proceed forward with the communication sequence for other messages (CRM, CML, and CRO) in which the data field represents the contents required for the electric power exchange. Accordingly, it is possible to confirm the establishment of the communication link (CRM) and to ensure the safety of the electric power exchange (CML, CRO).

The disclosed embodiment is requested to be considered as illustrative in all points and not restrictive. The scope of the disclosure is indicated by the scope of claims instead of the above description of the embodiment and is intended to include all modifications within the meaning and scope equivalent to the scope of claims.

What is claimed is:

1. A control apparatus of a vehicle configured to be able to charge an in-vehicle electric power storage device with electric power supplied from a charger provided outside the vehicle, the control apparatus comprising:
   an input and output unit configured to input and output signals transmitted and received between the vehicle and the charger; and
   an electronic control unit configured to control transmission and reception of the signals through the input and output unit according to a communication sequence defined in order to charge the electric power storage device, wherein:
   the communication sequence defines that the vehicle proceeds with the communication sequence based on a content represented by the signal received by the vehicle from the charger, the content including a data field;
   the electronic control unit is configured to proceed with the communication sequence without referring to the data field when the signal received from the charger is one of a charging stop message, a charger handshake message, a charging state message, or a charger statistical data message; and
   the electronic control unit is configured to proceed with the communication sequence by referring to the data field for acquiring information included in the data field when the signal received from the charger is not one of the charging stop message, the charger handshake message, the charging state message, or the charger statistical data message.

2. The control apparatus of the vehicle according to claim 1, wherein:
   the electronic control unit determines whether or not a control by the charger reaches a predetermined timeout time when the data field does not represent contents defined in the communication sequence; and
   the electronic control unit ends the control when a time from a start of the control by the charger reaches the predetermined timeout time.

3. A vehicle comprising:
   the electric power storage device; and
   the control apparatus according to claim 1.

4. A control method of a vehicle configured to be able to charge an in-vehicle electric power storage device with electric power supplied from a charger provided outside the vehicle, in which the vehicle is configured to transmit and receive signals to and from the charger according to a communication sequence defined in order to charge the electric power storage device and the communication sequence defines that the vehicle proceeds with the communication sequence based on a content represented by the signal received by the vehicle from the charger, the content including a data field, the control method comprising:
   determining whether or not the signal received from the charger is one of a charging stop message, a charger handshake message, a charging state message, or a charger statistical data message; and
   proceeding with the communication sequence without referring to the data field when the signal received from the charger is one of the charging stop message, the charger handshake message, the charging state message, or the charger statistical data message; and
   proceeding with the communication sequence by referring to the data field for acquiring information included in the data field when the signal received from the charger is not one of the charging stop message, the charger handshake message, the charging state message, or the charger statistical data message.

* * * * *